US006765719B2

US 6,765,719 B2

(12) United States Patent
Lundgren

(10) Patent No.: US 6,765,719 B2
(45) Date of Patent: Jul. 20, 2004

(54) MULTIPLE FIELD OF VIEW TELESCOPE

(75) Inventor: Mark A. Lundgren, Corona, CA (US)

(73) Assignee: The Boeing Company, Chicago, IL (US)

( * ) Notice: Subject to any disclaimer, the term of this patent is extended or adjusted under 35 U.S.C. 154(b) by 200 days.

(21) Appl. No.: 10/152,446

(22) Filed: May 21, 2002

(65) Prior Publication Data

US 2003/0218686 A1 Nov. 27, 2003

(51) Int. Cl.[7] .......................... G02B 15/02; G02B 23/00
(52) U.S. Cl. ..................... 359/432; 359/366; 359/399; 359/631
(58) Field of Search ................. 359/350–367, 359/399–432, 631

(56) References Cited

U.S. PATENT DOCUMENTS

| 4,354,742 A | * | 10/1982 | Abel et al. ................. 359/729 |
| 4,877,317 A | * | 10/1989 | Gibbons et al. ............ 359/421 |
| 5,113,281 A | * | 5/1992 | Mandelboum et al. ...... 359/236 |
| 5,161,051 A | * | 11/1992 | Whitney et al. ............ 359/351 |
| 5,686,979 A |   | 11/1997 | Weber et al. ................. 349/96 |
| 5,729,376 A | * | 3/1998 | Hall et al. ................... 359/366 |
| 5,847,879 A | * | 12/1998 | Cook .......................... 359/631 |
| 5,953,155 A | * | 9/1999 | Eckel et al. ................. 359/432 |

OTHER PUBLICATIONS

"Design of a space–qualified zoom lens for the Space Station Mobile Servicing System video Camera" published in Zoom Lenses, pp. 37–63, Proc. SPIE vol. 2539, 1995, Anthony B. Hull et al.

* cited by examiner

*Primary Examiner*—Thong Q Nguyen
(74) *Attorney, Agent, or Firm*—Alston & Bird LLP

(57) ABSTRACT

The optical system includes a first set of optics, an optical switch and a second set of optics. The first set of optics is capable of receiving light and directing the light along a first optical path. The optical switch is capable of directing a first portion of the light to continue along the first optical path, and directing a second portion of the light along a second optical path. The second set of optics is subsequent to the optical switch and is capable of receiving the first portion of light from the optical switch, and directing that portion of light along a third optical path. The third optical path and the second optical path are substantially co-aligned. The optical system has variable magnifications and requires no moving parts.

19 Claims, 2 Drawing Sheets

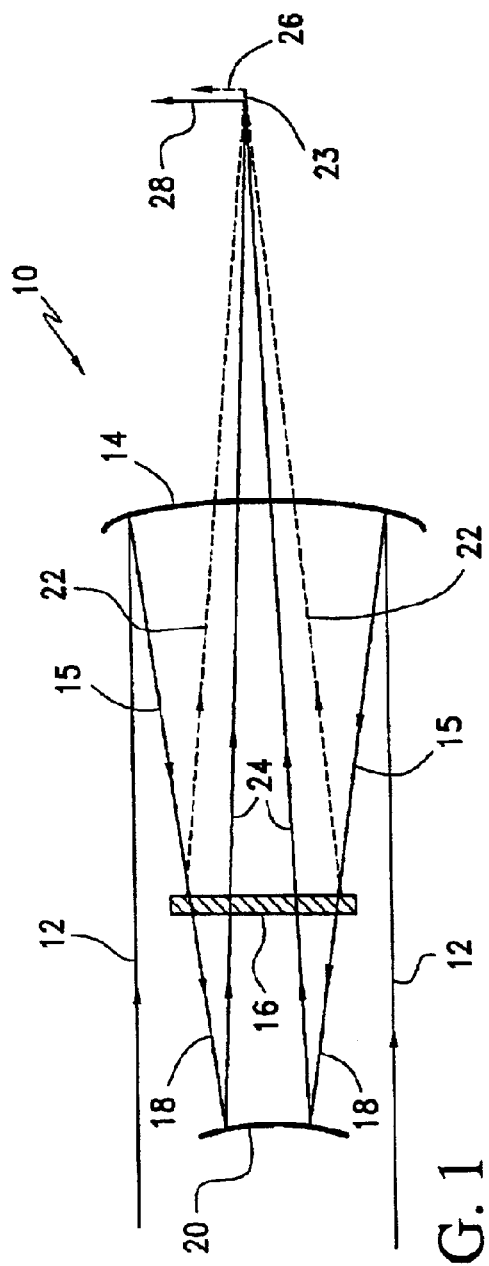
FIG. 1
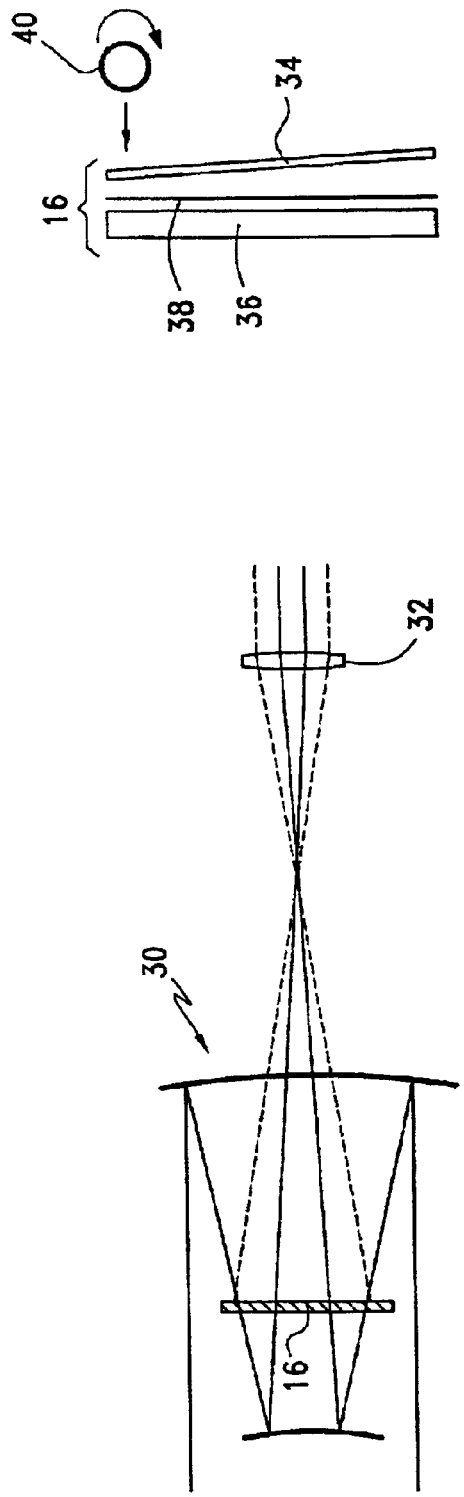
FIG. 2
FIG. 3

MULTIPLE FIELD OF VIEW TELESCOPE

BACKGROUND OF THE INVENTION

1. Field of the Invention

The present invention relates to zoom lenses and more particularly to a multiple field of view telescope without moving parts.

2. Description of the Related Art

Typically zoom lenses are not used in space applications because they are unreliable for spaceflight or are relatively heavy. Most space applications involve the use of two complete cameras rather than zoom lenses.

The major problem for space applications is that complex rotating mechanisms used in zoom lenses (or old-fashioned movie cameras with multiple lenses) are at high risk in the changing pressure and temperature conditions found in space flight. Such lenses are typically not used in space missions. Glass zoom lenses are also typically heavy, and thus not suitable for space missions.

Most traditional zoom lens designs have three moving groups: a zoom group, or variator, that changes the effective focal length (EFL); a compensating group that maintains a constant back focus as the zoom group moves; and a focus group in front of the zoom group that lets the zoom group see a virtual object at a fixed conjugate regardless of the actual object distance. This arrangement is desirable for manually operated zoom lenses, since a cam can cause the compensating group to track the zoom group, so that zoom and focus are independent functions.

However, it is not desirable for a spaceborne zoom lens. A mechanical cam has reliability problems with long-term operation in a hard vacuum; without a cam, three independent motor drives would be required. Each drive adds weight to the system and requires power. Also, every additional device degrades the mean time between failures (MTBF) of the system.

OCA Applied Optics developed a zoom lens for the Space Station Mobile servicing system video camera that obviated the need for a cam. (See paper entitled "Design of a space-qualified zoom lens for the Space Station Mobile Servicing System video camera" published in Zoom Lenses, Pages 37–63, Proc. SPIE Volume 2539, 1995, Anthony B. Hull et al.) The zoom lens used the compensating group to refocus as a function of zoom group position as well as object distance. This required only two moving groups and two motors, which gave rise to significantly enhanced reliability. However, this system still requires two linear stages (drives) and elaborate software in order to control the lens elements that move on these linear stages (instead of a cam).

What is desired is a lightweight system that can change focal lengths without moving parts.

SUMMARY

In a broad aspect, the optical system comprises a first set of optics, an optical switch and a second set of optics. The first set of optics is capable of receiving light and directing the light along a first optical path. The optical switch is capable of directing a first portion of the light to continue along the first optical path, and directing a second portion of the light along a second optical path. The second set of optics is subsequent to the optical switch and is capable of receiving the first portion of light from the optical switch, and directing that portion of light along a third optical path. The third optical path and the second optical path are substantially co-aligned. The optical system has variable magnifications and requires no moving parts. In some embodiments, a first set of optical components is capable of accepting an optical input and producing an output having a first image height or magnification. A second set of optical components, forming a second half of the system, accepts the output of the first set of optics and produces an output having different image height or magnification. In one state of the system, light travels through both sets of optics to produce an output. In a second state of the system, an optical switch bypasses the second set. Thus, the same system is capable of producing two different outputs.

In some embodiments, an optical switch, capable of reflecting or transmitting light is placed between the primary mirror and secondary mirror of a reflecting telescope. The optical switch can be used to bring a converging beam from the primary mirror to a focus, thus producing an image having one height, or the switch can be used to allow light to travel to the secondary mirror and converge to an image, having a different height. In some embodiments, the primary and secondary mirror can be arranged so that the two images occur at the same plane, where, for example, a CCD or film can be placed. Thus, such a system is verifocal, producing images of different magnifications.

In some embodiments, the optical switch is a stack of films, which transmit or reflect by interference, controlled by an electric field. Additionally, one or more of the films can be backed by a polished optical flat, in order to flatten the film surface, to enhance image quality.

In some embodiments, the optical switch is a dichroic beamsplitter, sending light of some colors through only the first set of optics and light of other colors through both sets. In some embodiments, a color imager, such as a three-color CCD, is used to demultiplex the two, different, images.

Thus, an optical system can produce images (or beams, in the case of an afocal system) of different magnifications with no moving parts, either switching between two images or producing two images in two different color bands.

Other objects, advantages, and novel features will become apparent from the following detailed description of the invention when considered in conjunction with the accompanying drawings.

BRIEF DESCRIPTION OF THE DRAWINGS

FIG. 1 is a schematic illustration showing the present invention implemented in the form of a two-mirror telescope.

FIG. 2 is a schematic illustration showing the addition of additional optics to provide an afocal system.

FIG. 3 is a schematic illustration of a method of forming a preferred type of optical switch that can be utilized in the present optical system.

The same parts or elements throughout the drawings are designated by the same reference characters.

DETAILED DESCRIPTION OF THE INVENTION

Figure 4:
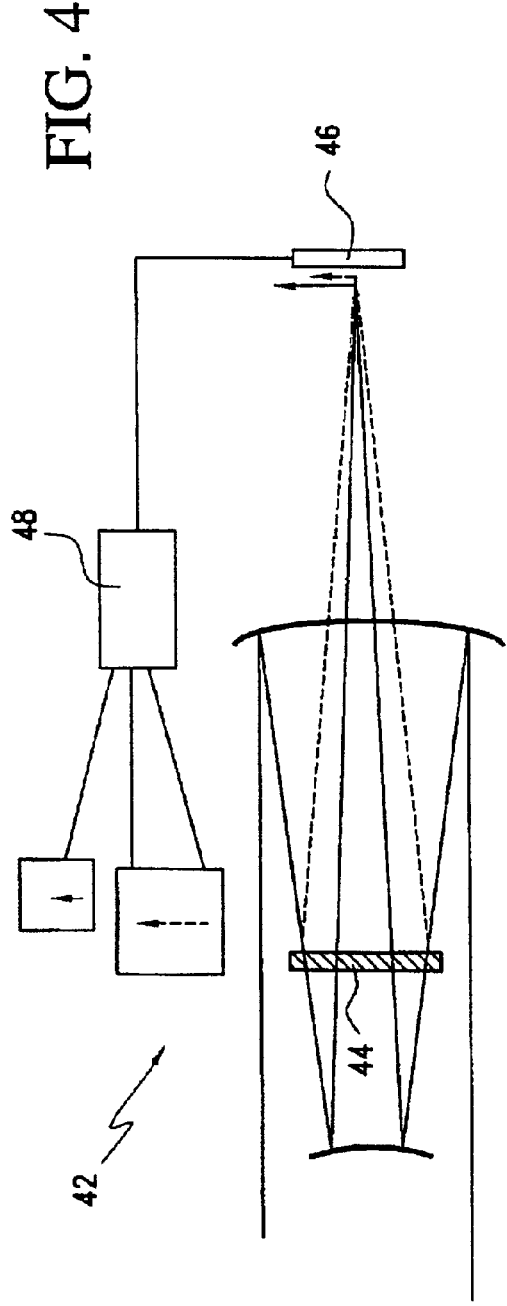
FIG. 4 shows the implementation of a dichroic beamsplitter as an alternative optical switch for the present system.

Referring now to the drawings and the characters of reference marked thereon, FIG. 1 illustrates a preferred embodiment of the present invention, designated generally as 10, in the form of a two-mirror telescope. Light 12 from an object (an object at infinity is illustrated but not required) strikes a first set of optics, e.g. positive primary mirror 14. It is directed on a first converging optical path, designated by numeral 15, toward an optical switch 16. The optical switch 16 is capable of being in transmitting state or a reflecting state, as will be described below in more detail. When it is in the transmitting state there is a telephoto effect (i.e., the combined system has a longer EFL than the primary mirror alone).

When the optical switch is transparent, a first portion 18 of light continues along the first optical path 15 toward a second set of optics, i.e. negative secondary mirror 20. However, when the optical switch is reflective, a second portion of the light is directed along a second optical path 22 to form an image 26 at focus point 23 at an image plane.

When the optical switch 16 is transparent, first portion 18 of the light that continues along first optical path 15 reflects from the secondary mirror 20. Because secondary mirror 20 has negative power, the convergence of the first portion 18 of light is decreased and that portion of light is directed along, what is termed herein, a third optical path 24, back through the optical switch 16, to substantially the same focus point 23 on the image plane. Because the convergence of the light is decreased, the EFL is larger. Therefore, there is a telephoto effect and an image 28, which is larger than image 26, is produced at focus 23. The optical switch 16 is properly positioned so that the converging paths 22 and 24 are substantially coaligned, i.e. have substantially the same axis, and also so either image 26 or 28 focus on substantially the same image plane, thus allowing a single imaging device or film to capture either image.

When the optical switch 16 is in a reflective state, the converging beam 22 is reflected from switch 16 and forms the non-telephoto image 26 at the focal plane without having traveled to secondary mirror 20.

When the optical switch is transparent, the effective optical system is telephoto, meaning the combination of mirrors acts like a mirror of less power (i.e. longer EFL) than primary mirror 14, and the resultant image 28 has a greater image height than if it had been formed by just the primary mirror 14.

In some embodiments, the primary mirror 14 is preferably parabolic, while the secondary mirror 20 is preferably hyperbolic. Thus, the on-axis image formed by the parabolic primary mirror alone (reflective state) is suitable for tracking a remote object and the Cassegrain telescope formed by the combination of parabolic primary and hyperbolic secondary (transmissive state) is a generally good imaging system. Of course, other embodiments can include optics with various conics or higher order surfaces, to form many different telescope types (e.g., Ritchey-Critien, all-spherical, Dahl Kirkham) which can be designed with or without refractive elements or correctors (e.g. a Schmidt corrector). Further, instead of a single mirror, each set of optics can contain multiple mirrors or lenses as required to achieve desired system performance.

Referring now to FIG. 2, an embodiment of the present invention is illustrated, designated generally as 30, in which additional optics are used to make the system afocal (i.e. not coming to a focus). This embodiment is similar to that of FIG. 1, however, a positive lens 32 is placed after the image plane, at approximately its focal distance from the image plane. Positive lens 32 may be a single lens or a system of lenses and/or mirrors. Positive lens 32 recollimates the light beams. Because the output beams have different heights, the system still has different magnifications, depending on the state of switch 16.

The optical switch 16 is preferably capable of being in a transmitting state or a reflecting state responsive to an electronic signal. An example of a basis for such a switch is described in U.S. Pat. No. 5,686,979, issued to Weber et al, incorporated, in its entirety, by reference herein. The '979 patent describes an optical panel comprising films and including a transparent optically active layer. The panel described in the '979 patent has a first and a second major surface, a first reflective polarizer disposed on the first major surface and a second reflective polarizer disposed on the second major surface. The optically active layer preferably comprises a liquid crystal device and the switching means preferably comprises a system of electronics for applying voltage across the liquid crystal device.

FIG. 3 illustrates an embodiment in which a switch 16 that is constructed using a film 34, such as described in the '979 patent, is backed on a polished optical substrate 36. A typical optical film is not sufficiently flat (e.g., to ¼ of a wavelength of visible light) to be used as a reflector in an optical system operating at visible wavelengths. However, if a polished optical flat is used as a substrate, sufficient flatness of the film can be achieved. In some embodiments, adhesive 38 is placed on the substrate 36 and then a roller 40 is used to press the film 34 onto the substrate 36, forming a flat optical surface on the film 34, which can then be incorporated into the panel.

FIG. 4 illustrates an embodiment, designated generally as 42, in which a dichroic beamsplitter 44 acts as the optical switch, images are received on a color CCD 46 (or imaging device, e.g. film, CMOS, TV camera), and an electronic box 48 is provided for producing RGB outputs. The dichroic beamsplitter 44 transmits a first wavelength band and reflects a second wavelength band. Thus, the first wavelength of light forms a larger telephoto image and the second wavelength of light forms a smaller non-telephoto image simultaneously. Together, the CCD 46 and electronic box 48 comprise an electronic imaging system capable of converting light at the first wavelength band and light of the second wavelength band into separable data signals. Thus, instead of forming only one image at a time, either the telephoto image or the non-telephoto image, this embodiment can produce both images simultaneously. The images are wavelength multiplexed rather than time multiplexed. However, color information is lost in the resulting pair of images. Also, because each image only uses a portion of the pixels on a conventional CCD, the images may be sampled at less than the spatial frequency of the CCD. Of course, an imaging device with simultaneous, fully sampled, color detection (e.g. the X3 imager produced by Foveon Corporation of Santa Clara) would fully sample the image.

Figure 5:
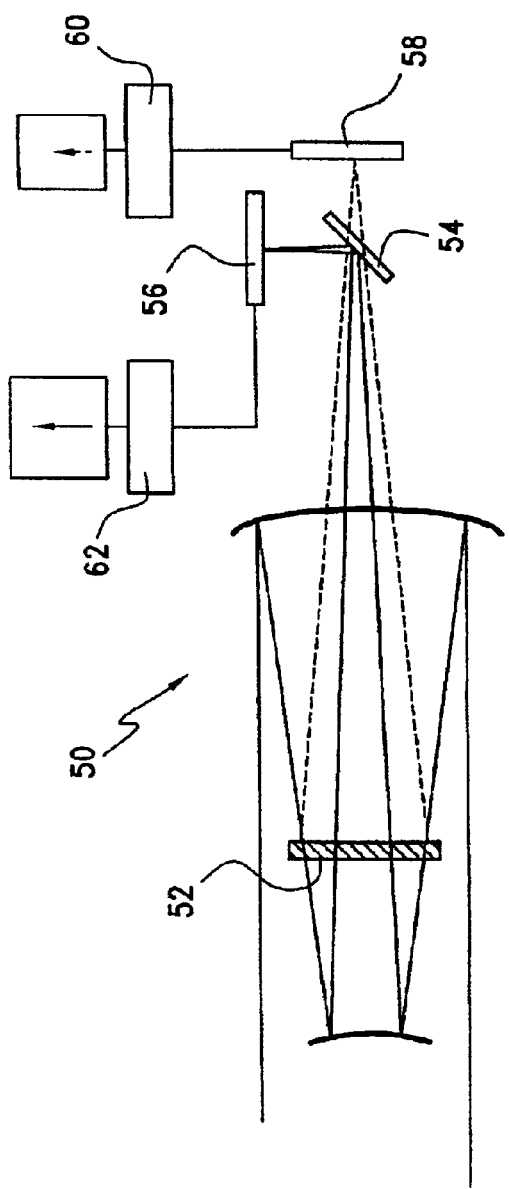
FIG. 5 illustrates the use of a dichroic beamsplitter acting as a switch and the demultiplexing of images by a second dichroic beamsplitter.

FIG. 5 illustrates another embodiment of the present invention, designated generally as 50, in which a dichroic beamsplitter 52 acts as a switch and images are demultiplexed by a second dichroic beamsplitter 54, received on two CCDs 56, 58. Electronic boxes 60, 62 are also provided as in the previous embodiment. In this embodiment, the image is sampled at the full spatial resolution of each CCD.

Obviously, many modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

1. An optical system comprising:
   a first set of optics capable of receiving light and directing the light along a first optical path;
   an optical switch capable of directing a first portion of the light to continue along the first optical path, and directing a second portion of the light along a second optical path; and,
   a second set of optics, subsequent to said optical switch, capable of receiving said first portion of light from said optical switch, and directing that portion of light along a third optical path,
   wherein the third optical path and the second optical path are substantially co-aligned.

2. The optical system of claim 1, wherein said first set of optics and said second set of optics form a telescope.

3. The optical system of claim 2, wherein light directed along the first and third optical paths forms a first image and light directed along the second optical path forms a second image.

4. The optical system of claim 3, wherein the first and the second image can be formed in substantially the same plane.

5. The optical system of claim 4, wherein said first and said second sets of optics are reflecting.

6. The optical system of claim 5, wherein said first set of optics comprises a parabolic mirror and said second set of optics comprises a hyperbolic mirror.

7. The optical system of claim 1, wherein said optical switch comprises optical films and switches responsive to an electric signal.

8. The optical system of claim 7, wherein said optical switch further comprises a polished optical flat and a portion of said optical films contact said optical flat.

9. The optical system of claim 1, wherein said optical switch is a dichroic beamsplitter, for transmitting a first wavelength band and reflecting a second wavelength band.

10. The optical system of claim 9, wherein said optical system is capable of forming a first image from the first wavelength band and a second image from the second wavelength band at roughly the same plane.

11. A multiple field of view telescope, comprising:
    a positive primary mirror, capable of receiving incoming light from a scene and directing the light into a first converging beam;
    a negative secondary mirror, capable of receiving said first converging beam from said primary mirror and directing it into a second converging beam, such that said beam comes to a focus at an image plane; and
    an optical switch, capable of being in a transmitting state or a reflecting state responsive to an electronic signal, wherein said optical switch is located between said primary mirror and said secondary mirror at a location such that if said optical switch is in the reflecting state said optical switch reflects the first converging beam directly to a focus at substantially the image plane.

12. The multiple field of view telescope of claim 11, wherein said light switch comprises optical films.

13. The multiple field of view telescope of claim 12, wherein said optical switch further comprises a polished optical flat and a portion of said optical films contact said optical flat.

14. The multiple field of view telescope of claim 11, wherein said primary mirror has a surface defined by a parabola and said secondary mirror has a surface defined by a hyperbola.

15. A multiple field of view camera, comprising:
    a positive primary mirror, capable of receiving incoming light from a scene and directing the light into a first converging beam;
    a negative secondary mirror, capable of receiving the first converging beam from said primary mirror and directing it into a second converging beam, such that the beam forms a first image at an image plane; and,
    a dichroic beamsplitter, capable of transmitting light having a first wavelength band and reflecting light having a second wavelength, wherein said dichroic is located between said primary mirror and said secondary mirror at a location such that light at the second wavelength is reflected directly to form a second image at roughly the same image plane as light at the first wavelength.

16. The multiple field of view camera of claim 15, wherein camera, further comprises:
    an electronic imaging system capable of converting light at the first wavelength band and light of the second wavelength band into separable data signals.

17. The multiple field of view camera of claim 16, wherein said electronic imaging system comprises a color CCD.

18. The multiple field of view camera of claim 16, wherein said electronic imaging system comprises:
    a first CCD for converting the first image to a first electrical signal;
    a second CCD for converting the second image to a second electrical signal; and
    a second dichroic beamsplitter for directing light of the first wavelength band to form the first image at the first CCD and light of the second wavelength band to form the second image at the second CCD.

19. A method for providing variable magnification of an optical system, comprising the steps of:
    receiving incoming light from a scene and directing the light into a first converging beam, using a positive primary mirror;
    receiving said first converging beam from said primary mirror, in a first mode of operation, and directing said first converging beam into a second converging beam, using a negative secondary mirror, such that said second converging beam comes to a focus at an image plane; and
    optically switching said first converging beam as desired by using an optical switch so that in a second mode of operation said first converging beam is reflected from said optical switch coming to a focus at substantially said image plane, wherein said first mode of operation provides magnification of said incoming light.

* * * * *

UNITED STATES PATENT AND TRADEMARK OFFICE
CERTIFICATE OF CORRECTION

PATENT NO. : 6,765,719 B2
DATED : July 20, 2004
INVENTOR(S) : Lundgren

It is certified that error appears in the above-identified patent and that said Letters Patent is hereby corrected as shown below:

Column 6,
Line 23, after "wherein" insert -- said --.

Signed and Sealed this

First Day of February, 2005

JON W. DUDAS
*Director of the United States Patent and Trademark Office*